US008000280B2

(12) United States Patent
Takechi et al.

(10) Patent No.: US 8,000,280 B2
(45) Date of Patent: Aug. 16, 2011

(54) NETWORK COMMUNICATION APPARATUS, NETWORK COMMUNICATION METHOD, AND ADDRESS MANAGEMENT APPARATUS

(75) Inventors: Hideaki Takechi, Osaka (JP); Toshiharu Koshino, Osaka (JP)

(73) Assignee: Panasonic Corporation, Osaka (JP)

( * ) Notice: Subject to any disclaimer, the term of this patent is extended or adjusted under 35 U.S.C. 154(b) by 477 days.

(21) Appl. No.: 12/089,178

(22) PCT Filed: Oct. 2, 2006

(86) PCT No.: PCT/JP2006/319714
§ 371 (c)(1),
(2), (4) Date: Apr. 3, 2008

(87) PCT Pub. No.: WO2007/043381
PCT Pub. Date: Apr. 19, 2007

(65) Prior Publication Data
US 2010/0014529 A1    Jan. 21, 2010

(30) Foreign Application Priority Data
Oct. 4, 2005    (JP) .................................. 2005-291757

(51) Int. Cl.
*H04H 20/71* (2008.01)
*H04W 4/00* (2009.01)
*H04L 12/56* (2006.01)
*H04L 12/28* (2006.01)
*H04J 3/16* (2006.01)
*H04J 3/22* (2006.01)
*H04J 3/24* (2006.01)

(52) U.S. Cl. ... 370/312; 370/338; 370/392; 370/395.31; 370/395.54; 370/466; 370/471; 370/475

(58) Field of Classification Search ........................ None
See application file for complete search history.

(56) References Cited

U.S. PATENT DOCUMENTS
7,302,496 B1 * 11/2007 Metzger ........................ 709/245
2003/0214955 A1 * 11/2003 Kim .............................. 370/400
(Continued)

FOREIGN PATENT DOCUMENTS
EP    1 783 622    5/2007
(Continued)

OTHER PUBLICATIONS
International Search Report issued Nov. 21, 2006 in the International (PCT) Application of which the present application is the U.S. National Stage.

*Primary Examiner* — Daniel J Ryman
*Assistant Examiner* — Nishant Divecha
(74) *Attorney, Agent, or Firm* — Wenderoth, Lind & Ponack, L.L.P.

(57) ABSTRACT

To connect arbitrary network communication apparatuses by selecting an appropriate route or identifying an IP address in an environment which includes a network using plural NAT routers, which is hierarchically connected through plural NAT routers for distributing private IPs. A network communication apparatus includes: a direct search unit which transmits a direct search request to another network communication apparatus; a route information obtaining unit which obtains route information of the network communication apparatus from a server which holds the route information of the network communication apparatus; and a communication control unit which performs, when the information regarding the other network communication apparatus is obtained upon the direct search request, communication with the other network communication apparatus based on the information, and which performs, when the information is not obtained, communication with the other network communication apparatus, based on the route information.

18 Claims, 11 Drawing Sheets

U.S. PATENT DOCUMENTS

| | | | |
|---|---|---|---|
| 2004/0139225 A1* | 7/2004 | Takahashi | 709/238 |
| 2005/0015584 A1 | 1/2005 | Takechi et al. | |
| 2005/0041596 A1 | 2/2005 | Yokomitsu et al. | |
| 2005/0105543 A1 | 5/2005 | Ikenaga et al. | |
| 2005/0286518 A1* | 12/2005 | Park et al. | 370/389 |
| 2009/0040995 A1* | 2/2009 | Buddhikot et al. | 370/338 |
| 2009/0158418 A1* | 6/2009 | Rao et al. | 726/12 |
| 2009/0175276 A1* | 7/2009 | Tsuge et al. | 370/392 |
| 2009/0180651 A1* | 7/2009 | Hilpisch et al. | 381/315 |
| 2010/0005288 A1* | 1/2010 | Rao et al. | 713/151 |

FOREIGN PATENT DOCUMENTS

| | | |
|---|---|---|
| JP | 3445986 | 9/2003 |
| JP | 2004-7671 | 1/2004 |
| JP | 2004-120547 | 4/2004 |
| JP | 2004-173240 | 6/2004 |
| JP | 2005-33250 | 2/2005 |
| JP | 2005-151142 | 6/2005 |
| JP | 2005-346608 | 12/2005 |
| WO | 2005/004417 | 1/2005 |

\* cited by examiner

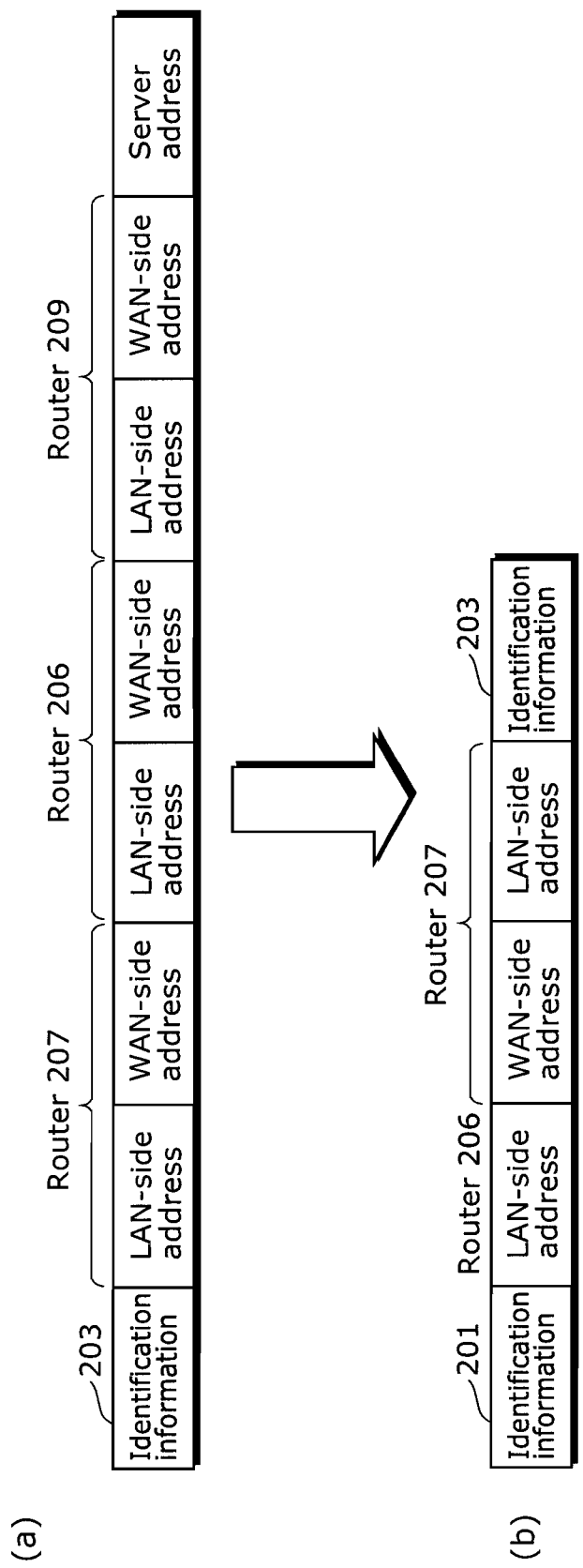

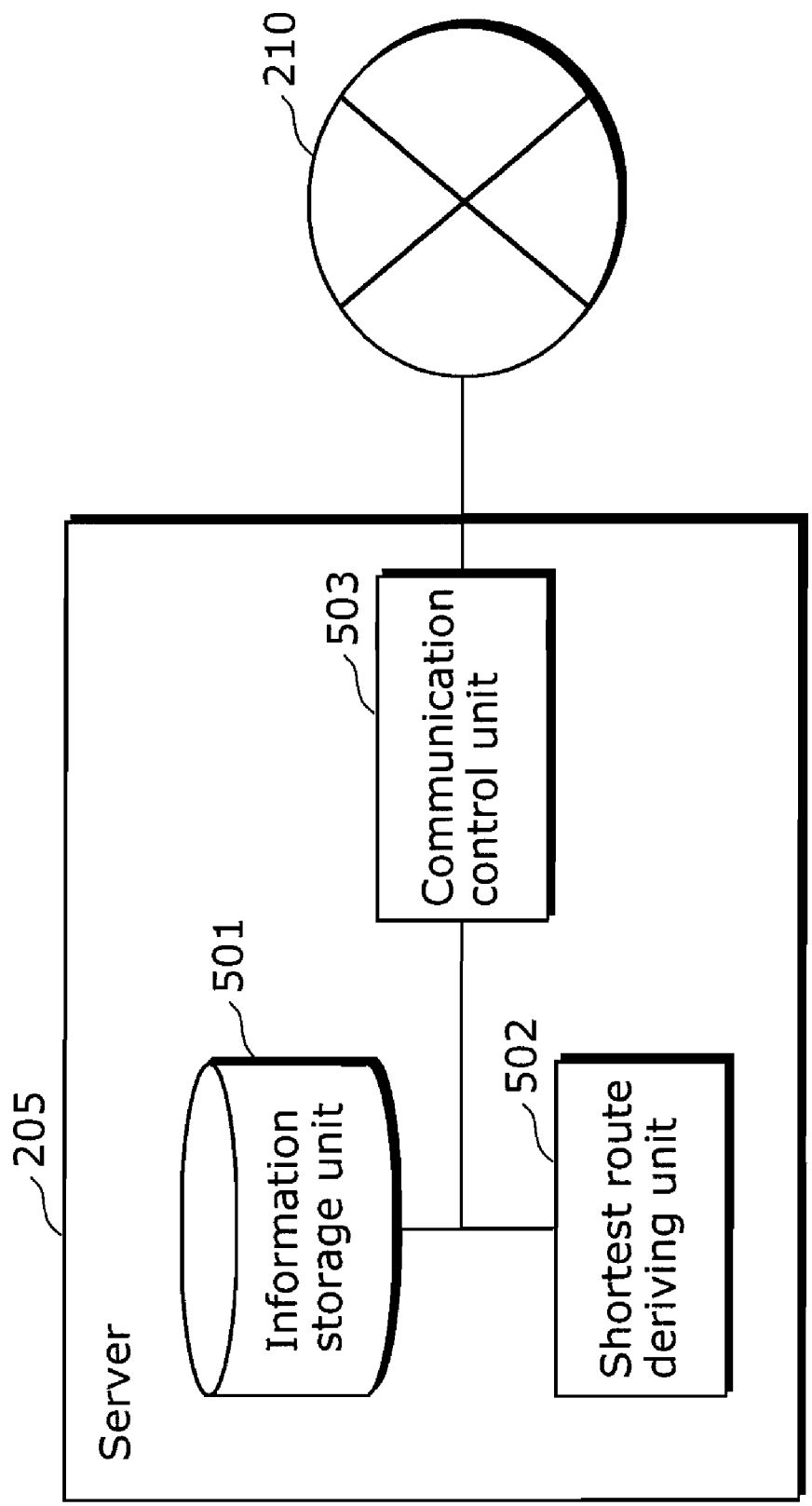

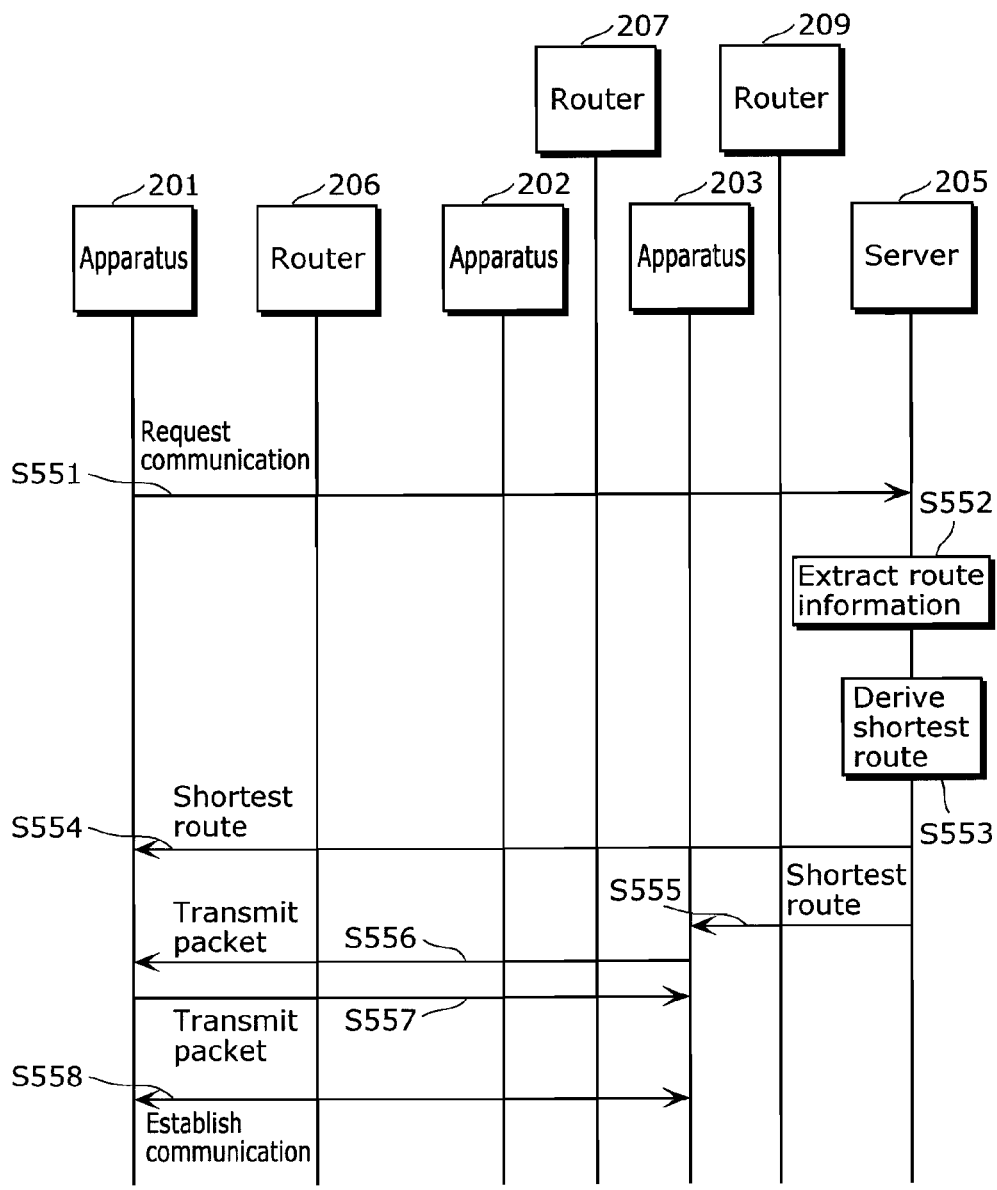

NETWORK COMMUNICATION APPARATUS, NETWORK COMMUNICATION METHOD, AND ADDRESS MANAGEMENT APPARATUS

TECHNICAL FIELD

The present invention relates to a network communication apparatus or the like which is connected to a network and which communicates with other apparatuses.

BACKGROUND ART

Recently, a constant-Internet-connection environment has been rapidly widespread, both at companies and general households, as a result of an improved broadband environment provided by ADSL, optical fiber, and so on. In addition, not only personal computers (PCs) but also household appliances, such as televisions, DVD recorders, air conditioners, and refrigerators, are continuously connected to the Internet and keep obtaining contents from a server through which they are connected to the Internet, while such household appliances communicate with each other, so as to give and receive, and share information.

For communications between apparatuses connected to the Internet, global IP addresses, which are assigned uniquely to the respective apparatuses, are used. However, due to a rapid increase in the number of apparatuses connected to the Internet, the number of global IP addresses tends to be insufficient. Therefore, PCs and household appliances that are not assigned with global IP addresses are connected to a router assigned with a global IP address, so that a Local Area Network (LAN), which is not directly connected to the Internet, is established. In the LAN, private IP addresses, which are unique only within the LAIN, are often used, and such private IP addresses are used only for communication taking place within the LAN.

On the other hand, private IP addresses are not unique on the Internet, and the use of such private IP addresses is not permitted on the Internet. Therefore, an apparatus having a private IP address cannot, by itself, communicate beyond the router with another apparatus connected to the Internet.

Problems like this can be solved with the Network Address Translation (hereinafter, referred to as NAT) function and the Network Address Port Translation (hereinafter, referred to as NAPT, and otherwise referred to as IP masquerade) function, which allow an apparatus assigned with a private IP address on the LAN to communicate with another apparatus on the Internet, through reciprocal conversion between private IP and global IP addresses. Note that the NAT function and the NAPT function have the same operating characteristics, and therefore are generically referred to as the NAT function where it is not necessary to distinguish these functions.

A router equipped with the NAT function (hereinafter, described as a NAT router) is not only used for connecting an apparatus having only a private IP address to the Internet but also widely used for connecting an apparatus making up a specific LAN and having only a private IP address with an apparatus making up another LAN.

Such a state is a connection mode commonly seen in cable television, in apartment Internet, and so on. A subscriber to cable television or the like has only a private IP address assigned by the cable-television side. That is, the cable-television side treats the subscriber's apparatus as part of the LAN connected to the NAT router owned by the cable-television side. Thus, in the case where the subscriber wants to connect plural apparatuses, the subscriber buys another NAT router and connects the apparatuses to the NAT router, so that the service is provided. As a result, a network structure using the Internet as a route and hierarchized with plural NAT routers is formed.

Note that in the Description and Claims, in order to avoid misunderstanding of terms, what is known as the Internet through which apparatuses having global IP addresses communicate with each other is referred to as the Internet, and from the perspective of the NAT router, the network on the side able to communicate through the Internet is referred to as a WAN-side network; from the perspective of the NAT router, the downstream network, which cannot be directly connected to the Internet, is referred to as a LAN-side network; and, from the perspective of a given apparatus, the network to which apparatuses are connected within the range not exceeding the NAT router is referred to as a local network. In addition, from the perspective of the NAT router, the address on the Internet side is referred to as a WAN-side address, and from the perspective of the NAT router, the address on the local-net side is referred to as a LAN-side address. The WAN-side address is equivalent to a global IP address in the case where the NAT router is directly connected to the Internet, and is equivalent to a LAN-side address set by the NAT router connected directly upstream in the case where the NAT router is not directly connected to the Internet.

FIG. 3 shows an example of a hierarchized network structure assumed in the present invention. Note that FIG. 3 does not necessarily show a conventional example, and that, in particular, the server 205 in FIG. 3 is a server according to the present invention.

A shared-facilities room 214, a shared wiring area 215, a house 1 (216), and a house 2 (217) are provided with apartment-network facilities. In the shared-facilities room 214, a NAT router 209 is provided, which is connected to the Internet 210 through an access line, and a global address is assigned to the WAN-side of the NAT router 209. The NAT router 209 distributes an arbitrary number of private IP addresses within an apartment building, according to a DHCP method or the like.

In the house 1 (216), a NAT router 206, which is directly connected to the NAT router 209, is provided. The LAN-side of the NAT router 206 is connected, through an intra-home LAN 211, to an apparatus 201, an apparatus 202, and a NAT router 207; to the NAT router 207, an apparatus 203 is connected. Inside the house 1 (216), a network using plural routers is established.

Meanwhile, in the house 2 (217), a NAT router 208 is provided, with its WAN-side being connected to the NAT router 209, and its LAN-side being connected, through an intra-home LAN 213, to an apparatus 204.

In such a network, which is connected and structured using NAT routers, there are two major problems regarding the operation of the NAT routers when a connection between arbitrary apparatuses is attempted. The first problem is that it is not possible to transmit a packet, when requested by the WAN-side, toward an apparatus belonging to the LAN-side of a NAT router. The other problem is that it is not easy to identify the WAN-side address of the NAT router to which the apparatus belongs. Patent Reference 1 discloses the details and problems of the NAT function that are described above.

Conventionally, the methods for connecting a given apparatus to an arbitrary apparatus within a network structure in which a NAT router is connected to the Internet include a method which combines the functions of an address registration server and a Universal Plug-and-Play Internet Gateway Device (hereinafter, referred to as UPnP-IGD). In the method, it is assumed that the NAT router is equipped with the UPnP-IGD function. The UPnP-IGD is a de-facto standard issued by the UPnP Forum, and equipped on a number of NAT routers. In the method, an apparatus in the LAN-side network can access the NAT router to which the apparatus is directly or indirectly connected and call the UPnP-IGD function, and refer to or setup a static NAT table in the NAT router. With this, it becomes possible to automatically set the static NAT table in the NAT router, without being through complicated manual settings by a user, so that the apparatus in the LAN-side network can automatically start communication, toward the apparatus itself, from the WAN-side. Furthermore, the method allows identification of the address of a connection-partner apparatus before starting the connection, by registering, in the address registration server, the WAN-side IP address of the NAT router that is obtained by UPnP-IGD function, or the Internet-side address of the NAT router that is detected by the server. An exemplary case where such a method is implemented is the Microsoft Messenger Service, which permits communication, file transfer, and other functions.

In addition, Patent Reference 2 discloses a technique for judging, through matching of global IPs, whether or not the apparatuses are connected to an identical NAT router, when communicating on the Internet or in the LAN through the above-described NAT router.

Patent Reference 1: Japanese Patent No. 3445986.
Patent Reference 2: Japanese Unexamined Patent Application Publication No. 2004-173240.

SUMMARY OF INVENTION

Problems that Invention is to Solve

However, the above-described conventional technique has a problem that arbitrary apparatuses cannot be properly connected in an environment using plural NAT routers, that is, where plural NAT routers are interveningly connected. In other words, according to a conventional method (1), where a WAN-side IP address obtained by the UPnP-IGD function is registered in an address registration server, it is not generally possible for the apparatuses, in the environment using plural NAT routers, to communicate with each other using the WAN-side IP address. According to a conventional method (2), where the Internet-side address of the NAT router, which is detected by the address registration server, is registered in the server, the apparatuses belonging to an identical NAT router cannot communicate with each other using the WAN-side IP address.

The above problems shall be illustrated by sequences in FIGS. 1 and 2. Here, it is assumed that the sequences in FIGS. 1 and 2 are performed on the network, which uses plural NAT routers, as shown in FIG. 3.

Conventional Method (1)

In FIG. 1 a network communication apparatus 203 obtains, according to the UPnP-IGD method, the WAN-side IP address of a NAT router 207, and registers the WAN-side IP address in a server 205.

Subsequently, when a network communication apparatus 204 intends to communicate with the network communication apparatus 203, the network communication apparatus 204 obtains, from the server 205, the address registered by the network communication apparatus 203, and attempts a connection based on the address. However, since it is possible to obtain only address information of the NAT router 207 that is connected directly upstream, it is not possible to communicate beyond a NAT router 206, and therefore communication is not possible.

Conventional Method (2)

In FIG. 2, the network communication apparatus 204 transmits a packet to the server 205, and the server registers, in the server 205, the source IP address of the received packet. Here, specifically, the WAN-side IP address, that is, the global IP address of the NAT router 209 is registered in the server 205.

Subsequently, when a network communication apparatus 201 obtains the registered address from the server 205 and attempts a connection to the network communication apparatus 204 based on the address, the packet is transmitted to a NAT router 209, not to a NAT router 208, and as a result, communication is impossible.

As above, when applying the conventional method to the network hierarchized with plural NAT routers, there are various problematic cases where connection cannot be performed.

Furthermore, when the purpose is limited to connecting a given apparatus to an arbitrary apparatus in the local network, another applicable method is the UPnP-DA method. According to the UPnP-DA standard (that is a standard defining basic functions such as device discovery), an apparatus connected to the network can search another apparatus by transmitting an IP multicast packet (the function referred to as a discovery function in the UPnP-DA standard), and can also notify the presence of itself to another apparatus (the function referred to as an advertise function in the UPnP-DA standard), thereby allowing identification of the function and the private IP address (LAN-side IP address) of the destination apparatus and establishment of a connection. With this, for example, it is possible to implement an apparatus which transmits and receives video and audio streams in a manner specified by the UPnP-AV standard (that is a standard for defining audio-visual functions, such as the functions of video and audio apparatuses), and the method is useful for a user since, for example, it allows automatic detection of an apparatus. However, assuming that the apparatus is a mobile apparatus, and that there are two cases where the apparatus is locally connected and where the apparatus is not locally connected, problems arise in terms of usefulness: for example, users have to identify the current connection state, use selectively the via-server method and the local-connection method, and change the application to be activated.

In addition, in the case where communication between communication apparatuses is ensured in the manner as described above, another problem arises. That is, depending on the route between the apparatuses for which communication is established, it is not necessary to secure the communication by encrypting the details of the communication, in the case where the communication route has high security, for example, when the communication route is provided only within an identical house. However, in the case where the communication route has low security, for example, when the route is via the Internet, it is preferable to perform secure communication. However, there exists no apparatus which can select between these communication methods. Furthermore, when communication takes place through plural routers, there is a case where secure communication is necessary even when the communication takes place between the apparatuses connected to a given router. Therefore, it is not easy for a communication apparatus to judge whether or not secure communication should be performed.

In other words, conventionally, since there is no simple and easy method for judging routes, another specific procedure is required for security judgment, apart from establishment of connection. Therefore, what security level to be applied is often judged according to the connection partner. For example, servers on the Internet carry out SSL communication, without judging the connection route from the client, in a page protecting a password and so on, or carry out IPsec communication, without judging the connection route, in the communication between remote-connected software supposed to be used as mobile and a VPN server or VPN router. However, according to the method like this, it is not possible to achieve optimal communication, in which, for example, the necessary security level is judged according to the route, so as to avoid unnecessary encryption.

The object of the present invention is to solve the above-described conventional problems. That is, the present invention provides a network communication apparatus which can also establish a connection between two arbitrary network communication apparatuses in the network hierarchized with plural NAT routers, and which, in doing so, can automatically judge whether or not a local connection is possible, and establish the local connection when possible.

Furthermore, the present invention provides a network communication apparatus, which can judge whether or not secure communication is necessary and perform secure communication where appropriate.

Means to Solve the Problems

In order to solve the problems, the network communication apparatus according to the present invention is a network communication apparatus which is connected to a network and which performs communication with another network communication apparatus through a router, and includes: a direct search unit which transmits a direct search request to another network communication apparatus with which communication is intended; a route information obtaining unit which obtains route information from an address management apparatus connected to the network, the route information including an address of a router that is passed on a way leading from the other network communication apparatus to the address management apparatus; a route deriving unit which derives a route leading from the network communication apparatus to the other network communication apparatus by comparing the route information obtained by the route information obtaining unit and route information of the network communication apparatus for reaching the address management apparatus; and a communication control unit which performs, when information regarding the other network communication apparatus is obtained upon the direct search request, communication with the other network communication apparatus, based on the information, and to perform, when the information is not obtained, communication with the other network communication apparatus, based on the route.

With this, the network communication apparatus can judge whether or not a local connection is possible with the other network communication apparatus, and can perform the connection when possible, and can perform connection with the other network communication apparatus by deriving the route when not possible.

Particularly, in the case where the network communication apparatuses communicate with each other through plural routers (using plural routers), it is possible to clearly recognize the connection state of a router connected to another router, so that smooth communication can be secured.

Moreover, with the above-described structure, in the case where the address management apparatus is suspended or where communication with the address management apparatus is not possible due to communication trouble or the like, it is possible to secure, at least, communication in the local connection.

In addition, it is preferable that the route information obtaining unit should request the route information only when information regarding the other network communication apparatus is not obtained in response to the transmission of the direct search request.

With this, it becomes possible to produce the advantageous effects described above while reducing the load on the address management apparatus and the traffic.

In addition, the network communication apparatus may further include: a route information creating unit which creates, when connected to the network, route information of the network communication apparatus for reaching the address management apparatus, and a route information registration unit which registers, in the address management apparatus, the route information created by the route information creating unit.

With this, it becomes possible to reliably secure communication between the network communication apparatuses.

In addition, assuming that the direct search request performed by the direct search unit is broadcast, the direct search request can be efficiently performed. Note that broadcast is to perform a direct search request through IP multicast, IP broadcast, or the like.

In addition, when information regarding the other network communication apparatus is identification information of the other network communication apparatus, communication can be reliably established with the network communication apparatus intending to communicate, without confusion with another communication apparatus, according to the identification information of the network communication apparatus intending to communicate.

In addition, in the case where information regarding the other network communication apparatus, which is judged by the communication control unit, is a session identifier shared, in advance, in the address management apparatus, by the network communication apparatus and the other network communication apparatus, it is possible to establish communication, without leakage of information intended to be confidential, such as identification information of the apparatus, in environments in which the local network is not closed to a network owned by a private owner, such as an environment in which broadcast to different users is possible in the case where network communication apparatuses provided for plural houses in an apartment or the like are connected to an identical router.

In addition, the network communication apparatus further includes an information storage unit in which the information regarding the other network communication apparatus is stored, wherein the communication control unit performs, when information regarding the other network communication with which communication is intended is obtained from the information storage unit, communication with the other network communication apparatus, based on the information, and to cause the route information obtaining unit to request the route information, when information regarding the other network communication apparatus is not obtained, and further, the information regarding the other network communication apparatus, which is stored in the information storage unit, may be an IP address of the local network to which the network communication apparatus is connected.

With this, once a connection is established, it is possible to select the connection method appropriate for the other network communication apparatus without transmitting the direct search request, thereby producing effects such as reduction of connection time. Particularly, in the case where private IP addresses are stored, direct communication becomes possible, and the time-reducing effect becomes prominent.

In addition, the route information creating unit may transmit, in an order starting from a router nearest to the network communication apparatus, a router information search request to a router that is present on a route leading to the address management apparatus, so as to sequentially obtain LAN-side addresses.

With this, it becomes possible to automatically generate route information for reaching the address management apparatus.

In addition, the route information creating unit may obtain a LAN-side address, based on an Internet Control Message Protocol (ICMP) response.

The LAN-side IP address of the NAT router can be obtained by using of a response specified by ICMP; therefore, it is possible to automatically generate route information regarding the route between the server and the apparatus by using the LAN-side IP address as an address of the destination of the router information search request.

In addition, it is preferable that the communication control unit should perform communication through the Virtual Private Network (VPN) connection, which involves encryption or packet encapsulation, in the case where communication is performed with the other network communication apparatus, based on the route information.

With this, it becomes possible to perform ordinary communication when a local connection is performed according to the connection route having been automatically selected, and to perform the VPN connection that involves encryption and packet encapsulation when a non-local connection having a possibility of being routed through somewhere outside the user's house is performed, so that security can be improved.

Note that the present invention, not only as the above-described network communication apparatus but also as a network communication method, can produce the same advantageous effects and solve the problems. Furthermore, the same effects are produced as a program causing computer to execute operations based on the network communication method.

In addition, the above problems can be solved with the following address management apparatus. In other words, the address management apparatus according to the present invention is an address management apparatus which is connected to a network and which performs communication, through a router, between network communication apparatuses, and includes: an information obtaining unit which obtains, from a network communication apparatus intending to communicate, information indicating that the network communication apparatus intends to communicate; a route deriving unit which compares (i) route information including an address of a router that is passed on a way leading from the network communication apparatus intending to communicate, to the address management apparatus, and (ii) route information including an address of a router that is passed on a way leading from the network communication apparatus with which communication is intended, to the address management apparatus; and a route transmitting unit which transmits the derived route to a network communication apparatus.

With this, it becomes possible to establish communication between network communication apparatuses without notifying an unnecessary route to a communication apparatus.

In addition, in order to solve the problems, the network communication apparatus according to the present invention is a network communication apparatus which is connected to a network and which performs communication, through a router, with another network communication apparatus, and includes a communication control unit which performs communication through the Virtual Private Network (VPN) connection, which involves encryption or packet encapsulation, in the case where communication with another network communication apparatus is performed beyond a predetermined router.

With this, it becomes possible to distinguish between communication that requires secure communication and communication that does not require secure communication, so that communication can be established under optimal security conditions.

Effects of the Invention

As described above, the present invention provides a network communication apparatus which also allows connection between two arbitrary network communication apparatuses in a network hierarchized with plural NAT routers; at the time, the network communication apparatus automatically judges whether or not a local connection is possible, and the local connection is performed when possible. In addition, it also becomes possible to reduce the load on an address administration apparatus and the traffic leading to the apparatus. Furthermore, it becomes possible to uniquely judge and secure improved security and privacy, thereby implementing a network communication apparatus which is useful, secure, and user-friendly.

BRIEF DESCRIPTION OF DRAWINGS

FIG. 9 is a diagram showing, conceptually, a shortest route.

FIG. 10 is a block diagram showing the functional structure of the server.

FIG. 11 is a sequence diagram showing the communication state between network communication apparatuses.

NUMERICAL REFERENCES

Figure 1:
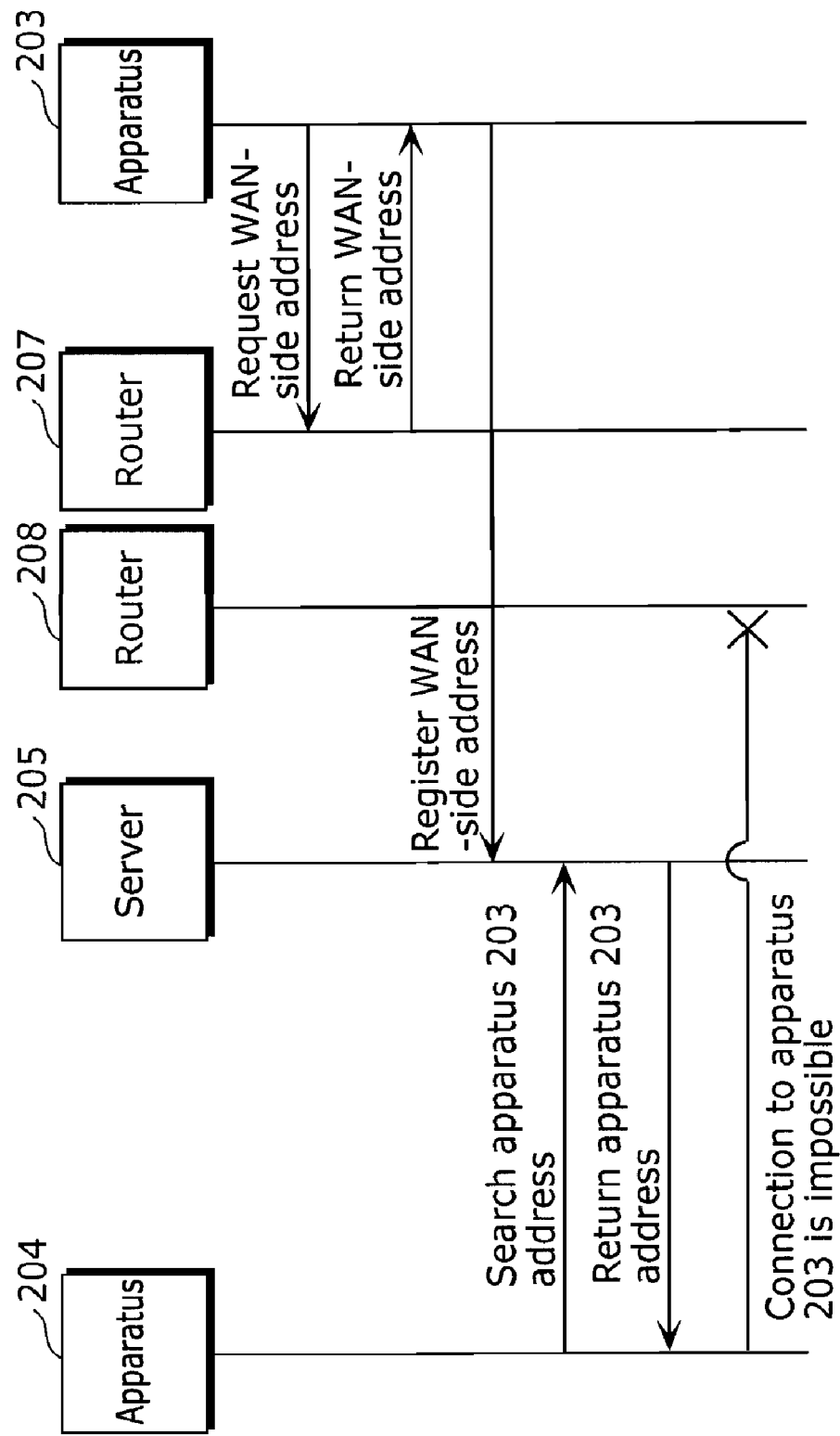
FIG. 1 is a diagram showing a communication sequence according to the prior art.
Figure 2:
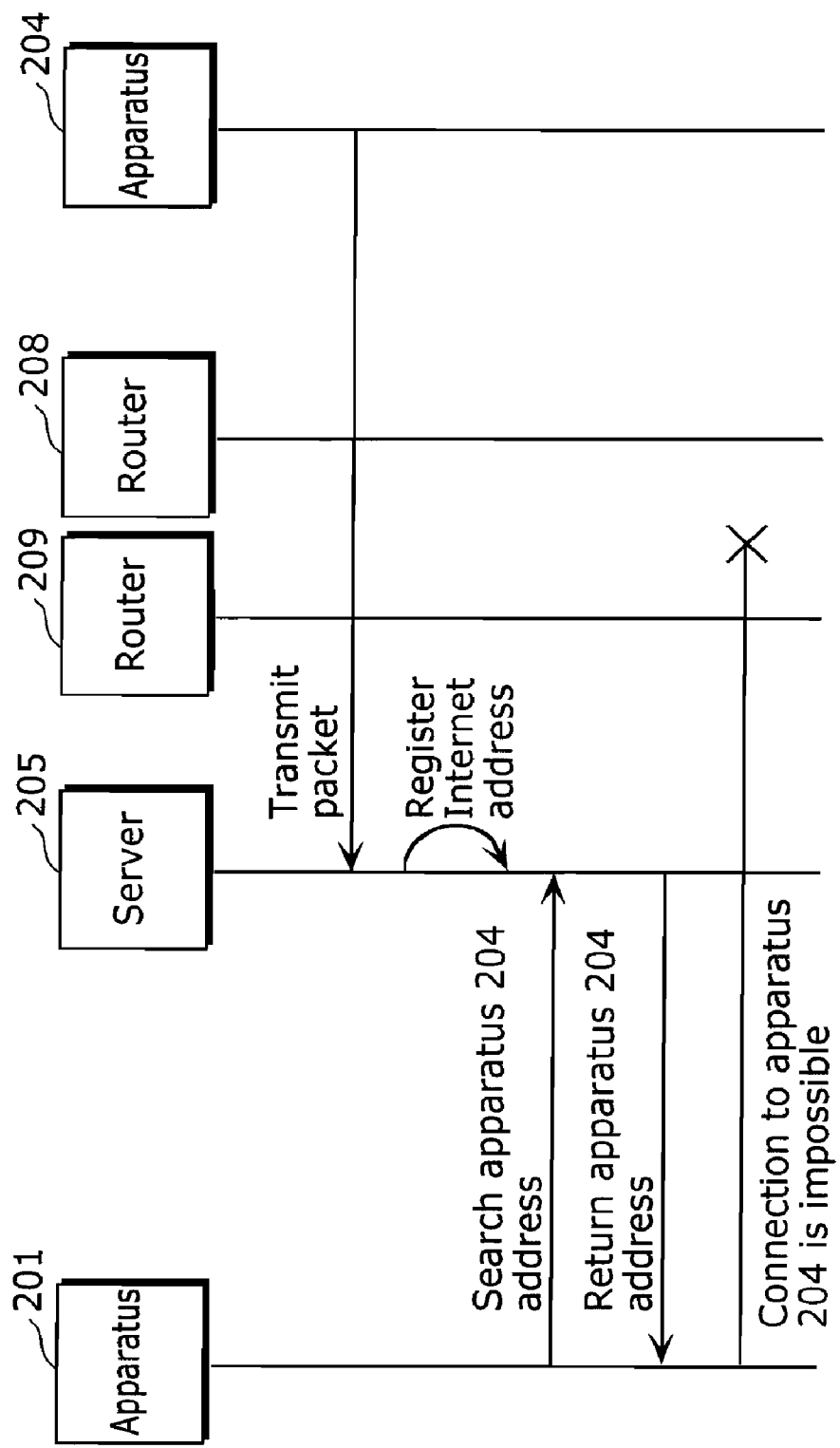
FIG. 2 is a diagram showing a communication sequence according to the prior art.

101 Communication control unit
102 Direct search unit
103 Route information obtaining unit
104 Route information creating unit
105 Route information registering unit
106 Shortest route deriving unit 107 Self-route storage unit
108 Information storage unit
201 to 204 Network communication apparatus
205 Server
206 to 209 NAT router
210 Internet
211 to 213 Local network
213 Shared-facilities room
215 Shared wiring area
216 House 1
217 House 2

DETAILED DESCRIPTION OF THE INVENTION

Hereinafter, a first embodiment of the present invention shall be described with reference to the drawings.

Figure 3:
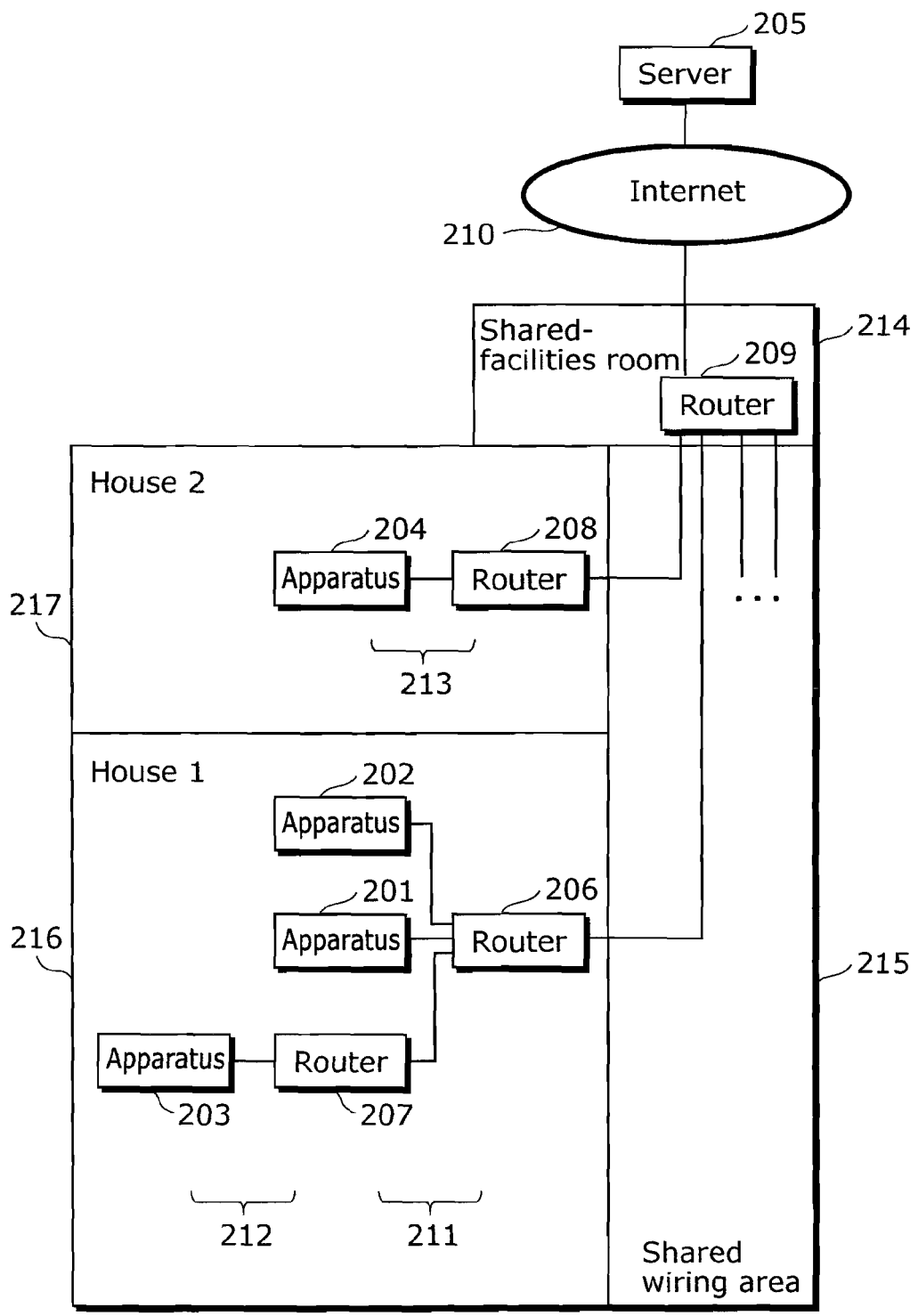
FIG. 3 is a diagram illustrating the connection state, which is assumed in the present embodiment and the prior art, for a network communication apparatus connected beyond a NAT router.

FIG. 3 is a network connection diagram in the present embodiment.

The embodiment shall be described below, based on the network connection diagram.

In the figure, a server 205 connected to the Internet 210 functions as an address management apparatus. Note that the description is omitted since the network, except for the server 205, has been described above (in the Background Art).

Figure 4:
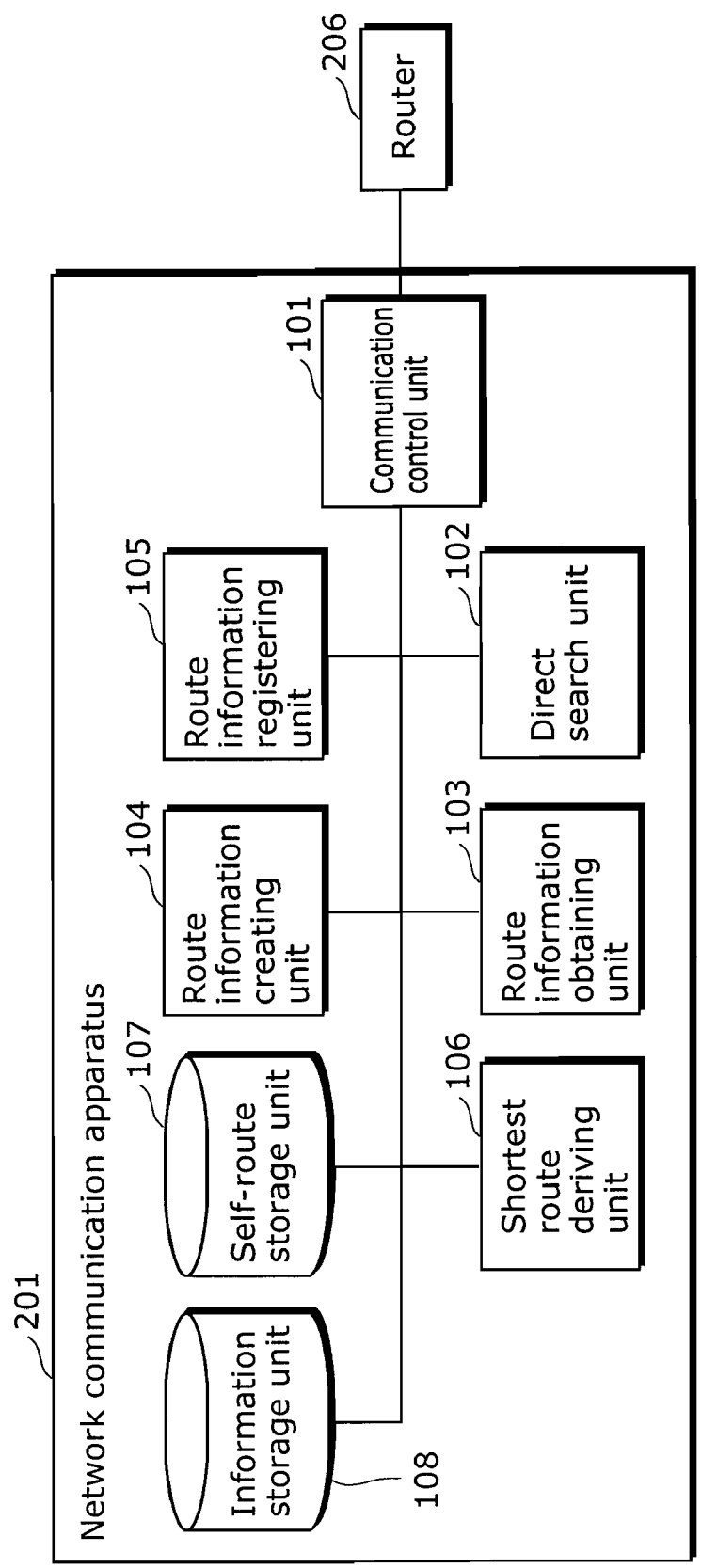
FIG. 4 is a block diagram showing the functional structure of the network communication apparatus according to the present embodiment.

FIG. 4 is a block diagram showing the functional structure of the network communication apparatus according to the present embodiment.

As shown in the figure, a network communication apparatus 201 is an apparatus which is connected to a NAT router 206 and can communicate with another network communication apparatus. The network communication apparatus 201 includes: a communication control unit 101, a direct search unit 102, a route information obtaining unit 103, a route information creating unit 104, a route information registering unit 105, a shortest route deriving unit 106 as a route deriving unit, a self-route storage unit 107, and an information storage unit 108.

The direst search unit 102 is a processing unit which transmits a direct search request to another network communication apparatus with which the network communication apparatus 201 intends to communicate.

The route information obtaining unit 103 is a processing unit which obtains route information corresponding to the identification information of the network communication apparatus with which communication is intended from the route information of the network communication apparatuses registered in the server 205 as an address management apparatus.

The communication control unit 101 is a processing unit which performs, when the identification information of the network communication apparatus with which communication is intended can be obtained upon a direct search request performed by the direct search unit 102, communication with the network communication apparatus corresponding to the identification information according to the private ID address related to the identification information, and which controls execution of communication and so on with the network communication apparatus, based on the route information obtained by the route information obtaining unit 103, when the identification information cannot be obtained.

Furthermore, the communication control unit 101 is a processing unit which controls execution of communication through the VPN connection, when analyzing the shortest route as described later and judging that secure communication is necessary.

Note that, for judging whether or not secure communication is necessary, it is sufficient to store information regarding intra-home routers (the routers 206 and 207), and judge that secure communication is necessary in the case where information regarding a router other than these routers is present in the shortest route.

Conversely, it is sufficient to store information regarding an extra-home router (router 209), which is connected directly upstream of the intra-home routers, and judge that secure communication is necessary in the case where information regarding the router 209 is present in the shortest route.

With this, it becomes possible to perform non-secure communication only on the network communication apparatuses connected to a router located downstream of a predetermined router, while performing secure communication on the others, so that high-speed capability and security of communication can be enjoyed.

The route information creating unit 104 is a processing unit which, upon detecting that the network communication apparatus 201 is connected to the network, creates route information for reaching the server 205. Note that a specific method for creating the address shall be described later.

The route information registering unit 105 is a processing unit which registers, in the server 205, the route information created by the route information creating unit 104.

The information storage unit 108 is a storage unit, such as a hard drive, in which, when identification information of the network communication apparatus with which communication is intended is obtained upon the direct search request carried out by the direct search unit 102, the identification information and the private IP address corresponding to the identification information are stored as being related to each other.

The self-route storage unit 107 is a storage unit for storing the self-route information for reaching the server 205, which is created by the route information creating unit 104.

The shortest route deriving unit 106 is a processing unit which derives the shortest route, based on the route information of the network communication apparatus 201 stored in the self-route storage unit 107 and the route information, obtained by the route information obtaining unit 103, regarding the network communication apparatus with which communication is intended. Note that the method for deriving the shortest route is described later.

Figure 5:
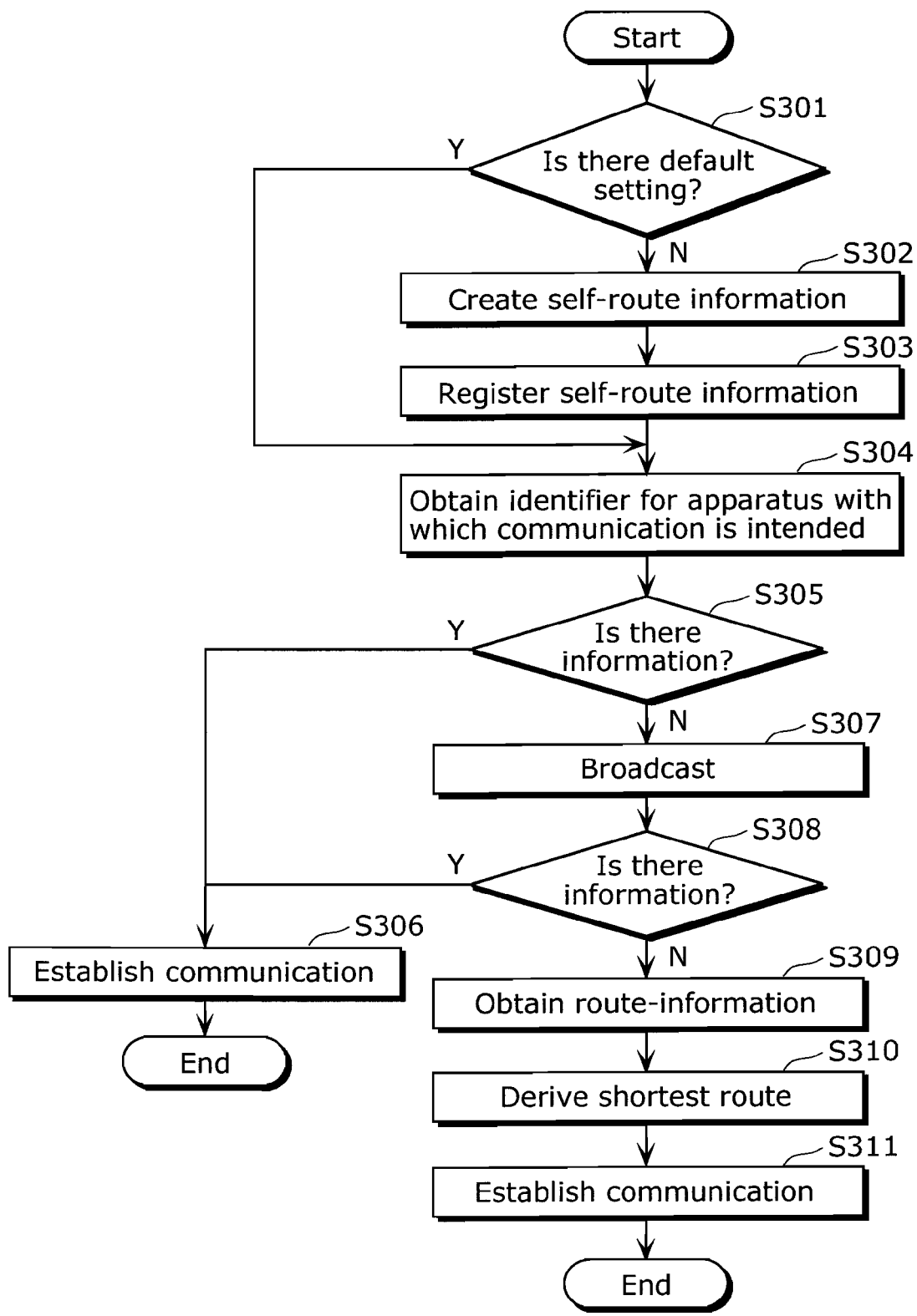
FIG. 5 is a flowchart showing the processing operation of the network communication apparatus.

FIG. 5 is a flowchart showing the processing operation of the network communication apparatus.

First, in the network communication apparatus 201, when initial setting is not performed (S301: N), the route information creating unit 104 automatically creates route information for reaching the server 205 (S302), and the route information of the network communication apparatus 201 is registered in the self-route storage unit 107 as being related to the self-identification information (S303).

Next, identification information of the network communication apparatus with which communication is intended is obtained (S304). Here, the communication control unit 101 inquires whether or not the identification information and a private IP address corresponding to the identification information are present in the information storage unit 108 (S305). When the information is present (S305:Y), communication is established according to the information (S306); meanwhile, when the information is not present (S305: N), broadcast is performed (S307).

When the communication control unit 101 judges that identification information of the network communication apparatus with which communication is intended is present in the information obtained through the broadcast (S308: Y), communication is established according to the information (S306). On the other hand, when the information is not present (S308: N), the route information obtaining unit 103 obtains, from the server 205, the route information corresponding to the identification information of the network communication apparatus with which communication is intended (S309).

Next, based on the route information, and the route information of the network communication apparatus 201 stored in the self-route storage unit 107, the shortest route deriving unit 106 derives the shortest route between the network communication apparatus 201 and the network communication apparatus with which communication is intended (S310).

Finally, communication is established based on the shortest route (S311).

Figure 6:
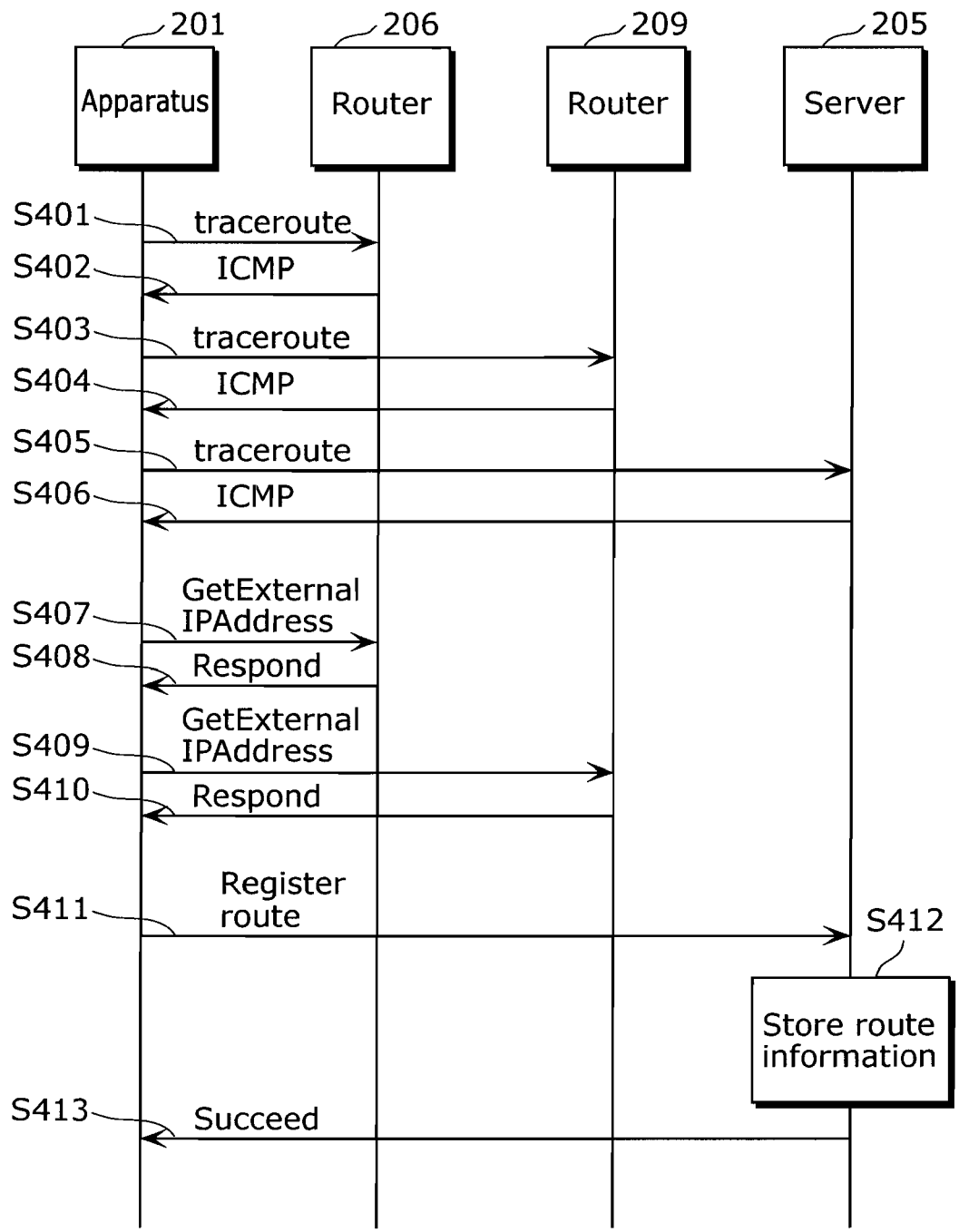
FIG. 6 is a diagram showing a sequence for creating and registering route information.

FIG. 6 is a sequence diagram showing the sequence for the creation of the self-route information that is performed by the network communication apparatus 201. Note that the sequence corresponds to the steps S301 and S302 in FIG. 5.

As a first phase for route information search, the network communication apparatus 201 collects LAN-side addresses that are to be destination addresses to which a router information search request is transmitted, according to the method following the general procedures for traceroute (a command for displaying a list of information regarding the network route from an apparatus to another apparatus). In the phase, first, the route information creating unit 104 in the network communication apparatus 201 transmits, to the server 205, an IP packet with its TTL (Time To Live: a value indicating packet validity period) being decreased. As for the type of the IP packet to be transmitted, for example, the following packets are applicable: an ICMP packet (Internet Control Message Protocol: protocol defined by RFC792), and an Echo Request (a request to send a response packet for checking the operating state of the apparatus and the communication state of the network) packet. When the network communication apparatus 201 transmits, to the server 205, an IP packet whose TTL is 1 (S401), the TTL is decreased to 0 in the NAT router 206. As a result, in the case where an ICMP Time Exceeded packet (an error packet to be transmitted, by the router, to the ICMP Echo Request transmitting apparatus in the case where the ICMP Echo Request packet is not able to reach the destination apparatus during a predetermined TTL (packet validity period)) is transmitted to the network communication apparatus 201 (S402), and the network communication apparatus 201 is able to obtain the LAN-side IP address of the router 206. In the same manner, the network apparatus 201 transmits a packet whose TTL is 2 (S403), obtains the LAN-side IP address of the NAT router 209 (S404), and, finally, obtains, as a packet responding to the packet transmitted to the server 205, an ICMP Echo Replay (a response packet for checking the operating state of the apparatus and the communication state of the network) (S405), and thus the first phase is completed.

Note that although in many cases the network communication apparatus 201 obtains a response from an ordinary router other than the NAT router that is present in the route leading to the server 205, the graphic representation shall be omitted here for sake of simplified description. In addition, in order for the network communication apparatus 201 to detect the LAN-side IP address of the NAT router 206 in the local network to which the network communication apparatus 201 belongs, it is also possible to detect the NAT router 206 by a plug-and-play method, following the device discovery procedures specified by the UPnP standard, instead of using the information shown in the present invention.

Next, as a second phase for route information search, the network communication apparatus 201 collects WAN-side addresses in accordance with the UPnP-IGD detection procedure. In the phase, the network communication apparatus 201 uses a Get External IP address action (that is an operation specified commonly in the WANPPP Connection service and the WANIP Connection service and used for obtaining, from an apparatus, the WAN-side IP address of the NAT router) of the WANPPP Connection service (that is a service for operating the PPP connection on the WAN-side of a NAT router and obtaining information, and usable in the case where the WAN-side of the NAT router is connected to a provider by PPP connection) or the WANIP Connection service (that is a service for operating the IP connection on the WAN-side of the NAT router and obtaining information, and usable in the case where the WAN-side of the NAT router is connected to the provider or an upstream NAT router by IP connection).

The network communication apparatus 201 transmits a Get External IP address to the LAN-side IP addresses of the respective routers having been searched in the first phase, in order of proximity to the apparatus and starting from the NAT router 206 (S407), so that the current WAN-side IP address of the NAT router 206 can be obtained as a response to the Get External IP address (S408). Likewise, the WAN-side IP address of the NAT router 209 is obtained (S409 and S410).

The route information registering unit 105 in the network communication apparatus 201 registers the obtained route information in the server 205, according to a database registration request packet (S411). The server 205 having received the database registration request packet stores, in the database registration step, the route information by relating the route information to the identification information for the network communication apparatus 201 (S412). The server 205 transmits a database registration response packet (S413), and thus the route-information creation and registration sequence is completed.

As a result of performing the above first and second phases, the route information creating unit 104 in the network communication apparatus 201 is able to obtain the WAN-side and the LAN-side addresses of the respective NAT routers on the network route leading from the network communication apparatus 201 to the server 205, and can create the route information.

FIG. 7(c) is a diagram showing, conceptually, the route information created by the route information creating unit 104.

As the figure shows, the route information includes: identification information of the network communication apparatus, the LAN-side and the WAN-side IP addresses of the respective NAT routers, and the address of the server 205.

As with the operation of the network communication apparatus 201 described above, each of the network communication apparatuses 202, 203, and 204 includes a route information creating unit and a route information registering unit, and registers the created route information in the server 205. With this, the route information shown in FIG. 7(b), FIG. 7(d), and FIG. 7(a) are registered as being related to the identification information of each of the apparatuses.

Figure 8:
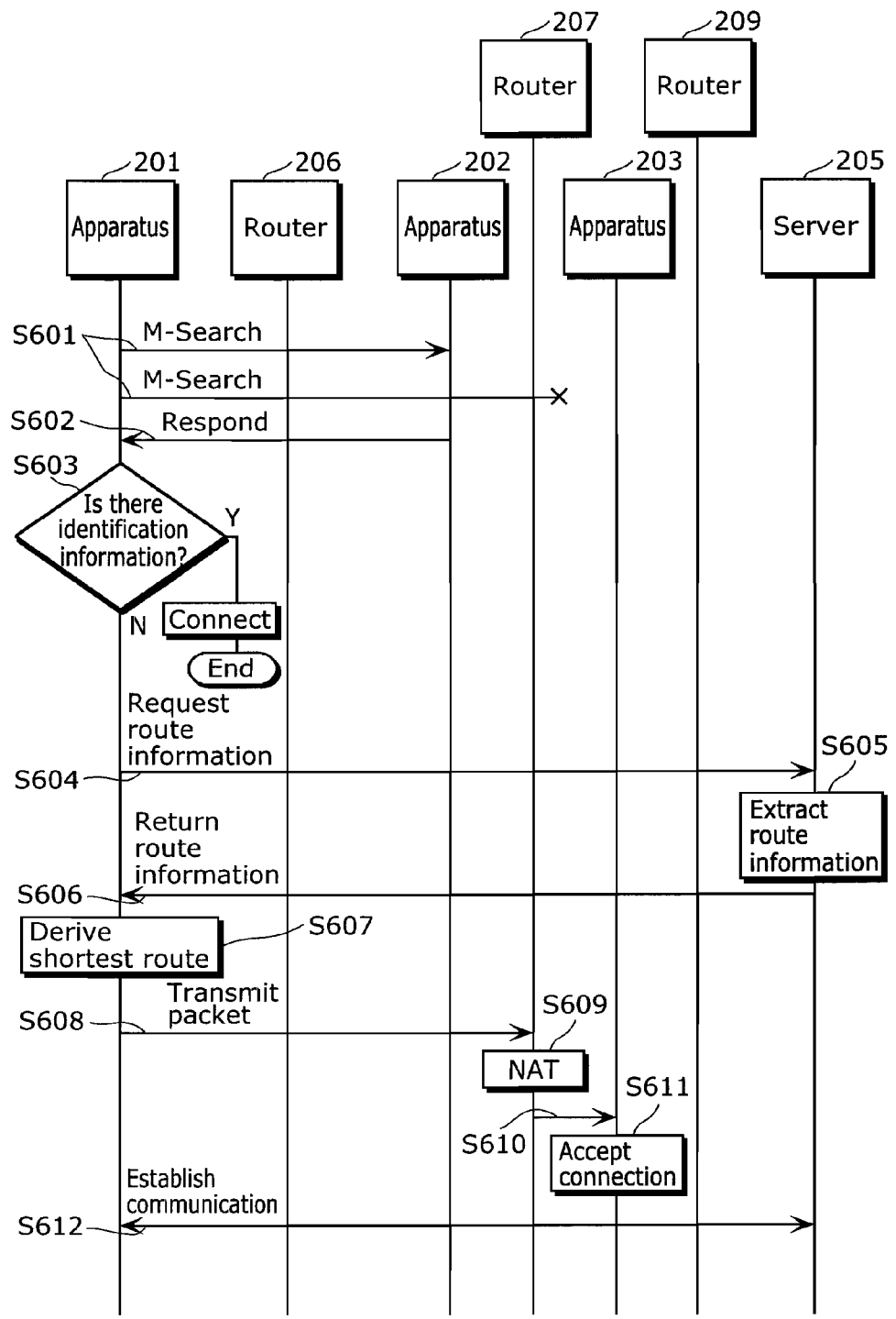
FIG. 8 is a diagram showing a sequence until the establishment of communication between network communication apparatuses.

Next, the operation for connecting the network communication apparatus 201 to the network communication apparatus 203 after completion of registration of the route information of the respective apparatuses shall be described according to the sequence diagram shown in FIG. 8.

First, the network communication apparatus 201 starts the sequence by identifying, through user operation and so on, identification information of another network communication apparatus 203 with which the network communication apparatus 201 intends to communicate.

First, the network communication apparatus 201 transmits, through multicast, an M-Search packet as specified by the UPnP standards, as a direct search request toward the local network to which the network communication apparatus 201 is connected (S601). Since the network communication apparatus 202 is the only apparatus, other than the network communication apparatus 201, that is connected to the local network, a response packet from the network communication apparatus 202 is obtained (S602); whereas a response from the network communication apparatus 203 is not obtained since the multicast packet does not pass the NAT router 207. Therefore, the communication control unit 101 in the network communication apparatus 201 confirms the identification information (S603), and judges that the network communication apparatus 203 has not been detected in the local network (S603: N).

Here, for the method of judging whether or not the network communication apparatus with which communication is intended is connected within the local network, for example, a Universally Unique Identifier (UUID) to which, generally, an apparatus specified by the UPnP standards and connected to a network is responsive may be used, and whether or not it is possible to obtain the UUID corresponding to the identification information of the network communication apparatus 203 may be judged. In addition, a device description document may also be obtained as an additional step for an apparatus able to communicate after the multicast, and based on the document, whether or not the description corresponding to the identification information of the network communication apparatus 203 is present may be judged. In the former, although the additional step is not necessary, it is necessary to hold the corresponding relations between the identification information and the UUID. On the other hand, in the latter, although the additional step is necessary, identification information can be directly obtained.

Note that, here, the method of detecting an apparatus on the local network from the network communication apparatus 201 has been described; however, in place of or in addition to this method, the network communication apparatus 201 may also connect and detach an apparatus on the local network, and monitor the IP address of the apparatus, using a multicast advertising packet specified by the UPnP standards.

In addition, here, the operation during which the network communication apparatus 201 is connected to the network communication apparatus 203 with which communication is intended has been described; however, in connecting from the network communication apparatus 201 to the network communication apparatus 202, when the network communication apparatus 201 obtains a response packet from the network communication apparatus 202 (S602), the network communication apparatus 202 can be detected in the local network (S603: Y), so that a direct connection can be established from the network communication apparatus 201 to the network communication apparatus 202.

With this, connection within the local network can be performed even when the server 205 is suspended, or when the communication between the server 205 and the network communication apparatus 201 is not possible due to communication trouble and so on within the Internet 210. Therefore, this method is safer.

Next, since the communication control unit 101 in the network communication apparatus 201 has judged, when the identification information is confirmed in Step S103, that the network communication apparatus 203, which is the destination, has not been detected within the local network (S603: N), the route information obtaining unit 103 transmits a database search request packet to the server 205, thereby requesting the route information (S604). The packet contains, as search conditions, the identification information of the network communication apparatus 203.

The server 205, having received the database search request packet, searches for the route information corresponding to the identification information of the network communication apparatus 203, extracts the already registered route information as shown in FIG. 7(d) (S605), and returns the extracted route information to the network communication apparatus 201, using the database search response packet (S606).

Next, the shortest route deriving unit 106 in the network communication apparatus 201 derives the shortest route by checking the route information of the network communication apparatus 203 as shown in FIG. 7(d), which is received from the server 205, against the route information of the network communication apparatus 201 shown in FIG. 7(c). The shortest route deriving unit 106 performs checking, as shown in FIG. 9(a), starting from the address nearest to the server 205. As a result of the checking, it is proved that the route information of both apparatuses are identical up to the addresses of the server 205, the NAT router 209, and the NAT router 206, and the addresses in the downstream of the NAT router 207 to which the network communication apparatus belongs are not identical. In this case, the shortest route deriving unit 106 in the network communication apparatus 201 selects the WAN-side address of the NAT router 207 as the address nearest to the server from among the addresses that do not match either piece of the route information, and derives the shortest route as sown in FIG. 9(b) (S607).

Next, the network communication apparatus 201 transmits a packet to the WAN-side address of the NAT router 207 (S608). Here, for ease of description, it is assumed that the NAT router 207 has a static NAT setting for transferring, to the network communication apparatus 203, the packet having reached the WAN-side. The NAT router 207, upon receiving the packet 108, performs the NAT operation (S609) and transfers the packet toward the network communication apparatus 203 (S610). The network communication apparatus 203, having received the transferred packet, performs an ordinary accept operation according to the packet type (S611). As described above, a connection is established between the network communication apparatus 201 and the network communication apparatus 203 (S612).

Note that the connection between the network communication apparatus 201 and the network communication apparatus 203 is established based on the result of the database search request, and therefore the communication control unit 101 may perform, the communication between the subsequent apparatuses through the VPN connection which involves encryption and packet encapsulation, based on the judgment that the communication is beyond the NAT router. With this, by connecting through a single VPN and performing encryption according to a high-security method suitable for communication beyond the NAT, arbitrary application communication can be performed without being through repeated connections.

In addition, in the present embodiment, the identification information and the information related to the identification information are obtained from the result of the direct search. However, it is also possible to use a session ID, which has been already shared between the network communication apparatuses through the server 205, instead of taking the information related to the identification information as fixed.

Assuming the case, as an example of the sequence like this, where connection is performed from the network communication apparatus 201 to the network communication apparatus 202, the following connection method may also be selected: the network apparatus 202 registers, in the server 205, its session ID related to the identification information of its own, and searches, after authentication with the server, the server 205 for the ID of the network communication apparatus 202 so as to obtain the corresponding session ID; the communication apparatus 202 returns the session ID in response to the direct search request; and the communication control unit 101 in the network communication apparatus 201 detects that the apparatuses are connected through the local network, by checking the session ID in the identification information checking step, so as to select the connection method. This method is more secure, since connection information is provided only for the apparatuses authenticated by the server when direct search can be executed beyond a house in the case where no Virtual LAN setting is provided for separating multicast packets according to each house in the network structure of the apartment Internet.

Note that it is also possible to have a structure in which direct search is not performed, and to establish communication based on the route address information obtained via the server 205. As an example of the structure, it is possible to adopt a structure in which communication is established by omitting the processes from S601 to S603.

In addition, with another structure which does not perform direct search, when communication is attempted from the network communication apparatus 201 to the network communication apparatus 203 without performing the steps S301 to S303 for registering the self-route information for reaching the server, the route information of the network communication apparatus 201, which is created by the network communication apparatus 201, is transmitted to the network communication apparatus 203 via the server 205. The network communication apparatus 203, having created the route information in advance, derives the shortest route in the shortest route deriving unit as shown in FIG. 9, based on the route information for the network communication apparatus 203 that is stored in the self-route storage unit and the received route information of the network communication apparatus 201, thus enabling communication with the network communication apparatus 201 based on the derived shortest route.

Note that, in the present embodiment, assuming, for ease of description, that the NAT router 207 has a static NAT setting for transferring the packet having reached the WAN-side to the network communication apparatus 203, the description of other methods for passing beyond the NAT router from the WAN-side has been omitted; however, it is also possible to adopt an arbitrary one or a combination of more than one method from among various methods, including: a method of passing the NAT router by making the static NAT setting in advance according to Add Port Mapping from the UPnP-IGD standards; a method for allowing, in advance, passing the NAT router by the method of transmitting a UDP packet specified by the RFC3489 (STUN) standards; a method for calling the apparatus with which connection is intended, according to the method of passing the NAT router by the method of transmitting the UDP packet specified in the Patent Reference 1 and performing the UPnP-IGD standards or the RFC3489 standards by the apparatus intending connection and the apparatus with which connection is intended in a coordinated manner; and a method of connecting apparatuses, simply from downstream to upstream of the NAT, which is possible in the route from the network communication apparatus 203 to the network communication apparatus 201.

Note that in the present embodiment, an example is shown in which only addresses are registered, but that passable ports and protocol types (TCP/UDP or the like) may also be registered according to the above-described method of passing the NAT router. With this, it becomes possible to share, with the partner apparatus, information necessary for communication as well as the route information, and therefore the structure is efficient and particularly preferable.

Note that in the present embodiment, the route information of the server 205 and the respective apparatuses are registered and stored in the server 205; however, when the respective network communication apparatuses intend to communicate and request route information from the server 205, the route information may also be obtained from the partner network communication apparatus via the server 205, or may also be transmitted to the partner network communication apparatus. According to the structure, it is not necessary to hold data in the server, thereby reducing the load on the server and saving time and effort for server maintenance. In addition, the communication procedure, and so on, described in Patent Reference 1 can be used for via-server communication like this.

Figure 7:
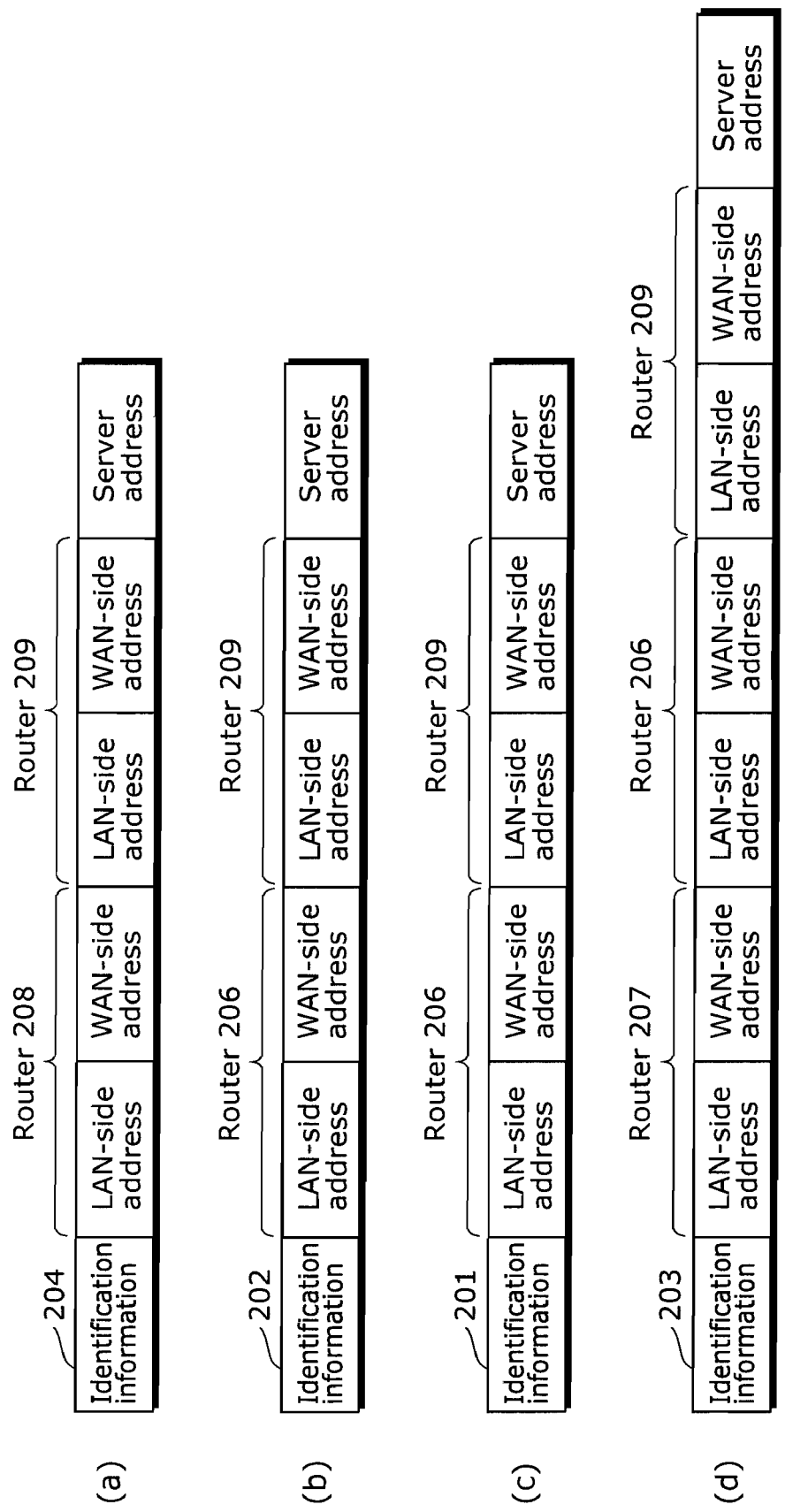
FIG. 7 is a diagram showing, conceptually, route information.

Note that in the present embodiment the shortest route deriving unit 106 in the network communication apparatus 201 derives the shortest route by checking the route information, and transmits a packet to the WAN-side address of the NAT router to which a network communication apparatus with which the network communication apparatus 201 intends to communicate is connected; however, the following method is also applicable in place of the above: the network communication apparatus 203 receives, via the server 205, a via-server connection request from the network communication apparatus 201, and the via-server connection request includes the route information of the network communication apparatus 201; the network communication apparatus 203 performs checking of route information, and in the checking, the route information of the network communication apparatus 203 shown in FIG. 7(*d*), which is held by the network communication apparatus 203, is checked against the route information of the network communication apparatus 201 shown in FIG. 7(*c*), which is received via the server, starting from the address nearest to the server 205; as a result of the checking, it is detected that the route information is identical Lip to the server-205 address, the NAT-router-209 address, and the NAT-router-206 address, whereas it is proved that, in the route information of the network communication apparatus 201, the address of the network communication apparatus 201 is not identical; therefore, the network communication apparatus 203 can select the address of the network communication apparatus 201, as the address nearest to the server, from among the addresses that do not match either piece of the route information, and send the connection packet to the address of the network communication apparatus 201. According to this structure, even in the case where the router (207) has no static NAT setting at all, it is possible to establish a connection easily between the network communication apparatus 201 and the network communication apparatus 203.

In addition, in the present embodiment, the shortest route having a smallest number of routers to be passed as a route has been illustrated as an example, but the route is not limited to this. For example, the route may be determined for reasons of high communication speed and so on although the number of routers to be passed is not the smallest.

Note that when the communication apparatus according to the present invention is connected directly, not through a router, to the Internet, the communication apparatus can be structured such that the route information of such a communication apparatus includes only the global IP address of its own and the server address.

The shortest route deriving unit, having detected the route information as above, selects, as the shortest communication route, the route through which the apparatus is directly connected, through the Internet, to the global IP address of the communication apparatus, and thereby can establish communication between apparatuses through operations that are completely identical in other points.

As above, according to the structure in which a connection request packet is transmitted from the network communication apparatus located at the connection-accepting side, it is possible to establish connection without taking unnecessary steps in the case where it is easier to follow the method of establishing connection by causing the network communication apparatus at the connection-accepting side to transmit a connection request packet to the network communication apparatus at the connection-starting side.

In addition, it is not possible, generally, to tell from which one of the two apparatuses the connection request packet should be transmitted in order to establish connection easily. Therefore, the connection can be established more easily and more reliably with the structure which allows, by using both of the above-described methods together, both the network communication apparatus 201 and the network communication apparatus 203 to check the route information and establish, when the optimal route is successfully judged, connection from either one of the network communication apparatus 201 and the network communication apparatus 203.

According to the sequence as described above, it is possible to provide a communication apparatus which can communicate with an arbitrary apparatus in a network hierarchized with plural NAT routers. In such a case, it becomes possible to select the optimal connection method and route and connect a given apparatus to another apparatus, without the user searching for the network structure and IP addresses.

Next, an embodiment for the case where the server 205 derives the shortest route shall be described.

Note that since the network communication apparatuses 201 and 203 have the same apparatus structure as described above, the description is omitted.

FIG. 10 is a block diagram showing the functional structure of the server according to the present embodiment.

As the figure shows, the server 205 is a server which can derive the shortest route between network communication apparatuses, and includes: an information storage unit 501, a shortest route deriving unit 502, and a communication control unit 503.

An information storage unit 501 is a storage unit such as a hard drive, in which route information, created by each of the network communication apparatuses and including a pair of the LAN-side address and the WAN-side address of a router to be passed until reaching the server 205, is stored as being related to the identification information of the network communication apparatus and the private IP address corresponding to the identification information.

The shortest route deriving unit 502 is a processing unit which derives the shortest route by obtaining, from the information storage unit 501, the route information corresponding to the network communication apparatus 201 (the calling side) which requests communication, and route information corresponding to the communication apparatus 203 (the called side) from which communication is requested. Note that the method of deriving the shortest route is the same as the method described earlier.

The communication control unit 503 is a processing unit which receives, from the network communication apparatus 201, information that the network communication apparatus 201 intends to communicate (information of the calling side, information of the called side, a shortest route request packet, and so on). In addition, the communication control unit 503 is a processing unit which transmits the shortest route derived in the shortest route deriving unit 502 to both of the calling side (the network communication apparatus 201) and the called side (the network communication apparatus 203).

FIG. 11 is a sequence diagram showing the communication state between network communication apparatuses.

The sequence diagram shown in the figure illustrates a sequence after the communication control unit 101 in the network communication apparatus 201 judges that the network communication apparatus 201 with which communication is intended could not be detected within the local network.

First, information that the network communication apparatus 201 intends to communicate with the network communication apparatus 203 is transmitted to the server 205 (S551).

The communication control unit 503 in the server 205 transmits, to the shortest route deriving unit 502, identification information for distinguishing between the calling and the called sides, and the shortest route deriving unit 502, having received the information, extracts the route information for the calling and the called sides from the information storage unit 501 (S552). Subsequently, these two pieces of route information are compared, and the shortest route is derived (S553).

Next, the shortest route is transmitted to both of the network communication apparatus 201 and the network communication apparatus 203 (S544 and S555).

Next, the network communication apparatus 201, in which the route information obtaining unit 103 also functioning as a route obtaining unit has obtained the transmitted the shortest route, transmits a packet to the WAN-side address of the NAT router 207 (S556), and the network communication apparatus 203, having received the shortest route in the same manner, transmits a packet to the WAN-side address of the NAT router 206 (S557).

Here, the addresses are transmitted to both calling and called sides, and the packets regarding communication requests are transmitted from both sides. However, when communication is established (when an accept operation is performed) upon one of the requests, the other is cancelled (S558). With this, early establishment of communication becomes possible since communication is established by one of the packets which arrives earlier. Therefore, this method is preferable.

In addition, the following case or the like is assumed where the router 207 is a model which does not allow the static NAT setting. For example, even when the connection from the network communication apparatus 201 to the network communication apparatus 203 is not successful, the connection from the network communication apparatus 203 to the network communication apparatus 201 succeeds. Therefore, this method is preferable also in terms of improved connection rate.

As described above, when the server 205 derives and transmits the shortest route, it is sufficient to communicate the necessary router address, thereby allowing reduction of communication charges and smooth maintenance of the traffic.

Note that in the present embodiment, the shortest route is transmitted to both calling and called sides, but the present invention is not limited to this, and the shortest route may be transmitted to one of the sides.

In addition, in the present embodiment, the shortest route created by the server 205 is transmitted as data regarding the route information; however, the information regarding the route information is not limited to this. For example, the route information for reaching the server 205 from the network communication apparatus 201 requesting for communication may be transmitted to the network communication apparatus 203 that is the called side. In this case, the shortest route deriving unit 106 in the network communication apparatus 203 derives the shortest route based on the route information and the self-route information of the network communication apparatus 203, and attempts to establish communication toward the network communication apparatus 201 that is the calling side, using the shortest route.

INDUSTRIAL APPLICABILITY

The present invention can be applied particularly to a network communication apparatus connected to a network hierarchized with plural NAT routers, and can further be applied to a network communication apparatus connected beyond a local connection and a NAT router.

The invention claimed is:

1. A network communication apparatus which is connected to a network and which performs communication with a second network communication apparatus through one or more routers equipped with an address conversion function (hereinafter, referred to as a "NAT router"), said network communication apparatus comprising one or more processors including:
   a direct search unit configured to transmit a direct search request to the second network communication apparatus;
   a route information obtaining unit configured to obtain first route information from an address management apparatus connected to the network, the first route information including a LAN side address and a WAN side address of each NAT router that is passed on a way leading from the second network communication apparatus to the address management apparatus;
   a route deriving unit configured to derive a route leading from said network communication apparatus to the second network communication apparatus by comparing the first route information and second route information, the second route information including a LAN side address and a WAN side address of each NAT router that is passed on a way leading from said network communication apparatus to the address management apparatus; and
   a communication control unit configured to perform communication with the second network communication apparatus,
   wherein said communication control unit performs communication directly with the second network communication apparatus through a local network using an address of the second network communication apparatus obtained by said direct search unit when it is detected by the direct search request that the second network communication apparatus and said network communication apparatus belong to the local network, and
   wherein said communication control unit performs communication with the second network communication apparatus based on the route derived by the route deriving unit when it is not detected by the direct search request that the second network communication apparatus and said network communication apparatus belong to the local network.

2. The network communication apparatus according to claim 1,
   wherein said network communication apparatus and the second network communication apparatus communicate with each other through plural NAT routers.

3. The network communication apparatus according to claim 1,
   wherein said route information obtaining unit is configured to obtain the first route information only when information regarding the second network communication apparatus is not obtained in response to the transmission of the direct search request.

4. The network communication apparatus according to claim 1, wherein said one or more processors further include:
   a route information creating unit configured to create, when connected to the network, the second route information; and
   a route information registration unit configured to register, in the address management apparatus, the second route information created by said route information creating unit.

5. The network communication apparatus according to claim 4,
   wherein said route information creating unit is configured to transmit, in an order starting from a NAT router nearest to said network communication apparatus, a NAT router information search request to a NAT router that is present on a route leading to the address management apparatus, so as to sequentially obtain LAN side addresses.

6. The network communication apparatus according to claim 4,
   wherein said route information creating unit is configured to obtain a LAN side address based on an Internet Control Message Protocol (ICMP) response.

7. The network communication apparatus according to claim 1,
   wherein the direct search request performed by said direct search unit is broadcast.

8. The network communication apparatus according to claim 1,
   wherein said communication control unit obtains information regarding the second network communication apparatus, and
   wherein the information regarding the second network communication apparatus, which is obtained by said communication control unit, is identification information of the second network communication apparatus.

9. The network communication apparatus according to claim 1,
   wherein said communication control unit obtains information regarding the second network communication apparatus, and
   wherein the information regarding the second network communication apparatus, which is obtained by said communication control unit, is a session identifier shared, in advance, in the address management apparatus, by said network communication apparatus and the second network communication apparatus.

10. The network communication apparatus according to claim 1, wherein said one or more processors further include an information storage unit in which information regarding the second network communication apparatus is stored,
   wherein said communication control unit is configured to perform, when the information regarding the second network communication with which communication is intended is obtained from said information storage unit, communication with the second network communication apparatus based on the information, and to cause said route information obtaining unit to request the first route information when the information regarding the second network communication apparatus is not obtained.

11. The network communication apparatus according to claim 10,
wherein the information regarding the second network communication apparatus, which is stored in said information storage unit, is an IP address of the local network to which said network communication apparatus is connected.

12. The network communication apparatus according to claim 1,
wherein said communication control unit is configured to perform communication through a Virtual Private Network (VPN) connection, which involves encryption or packet encapsulation, when it is not detected that said network communication apparatus and the second network communication apparatus belong to the local network and communication is performed with the second network communication apparatus based on the route.

13. The network communication apparatus according to claim 1,
wherein said route deriving unit derives a shortest route as the route leading from said network communication apparatus to the second network communication apparatus by comparing the first route information and the second route information.

14. The network communication apparatus according to claim 1,
wherein said route deriving unit derives the route leading from said network communication apparatus to the second network communication apparatus by (i) determining LAN side addresses and WAN side addresses that are included in both the first route information and second route information, (ii) determining LAN side addresses and WAN side addresses that are not included in both the first route information and the second route information, and (iii) determining a NAT router, which has a LAN side address and a WAN side address included in both the first route information and second route information, that is farthest away from the address management apparatus, and
wherein the route leading from said network communication apparatus to the second network communication apparatus includes (i) identification information of said network communication apparatus, (ii) LAN side addresses and WAN side address included in the second route information that are not included in both the first route information and the second route information, (iii) the LAN side address of the NAT router determined to be farthest away from the address management apparatus, (iv) LAN side addresses and WAN side address included in the first route information that are not included in both the first route information and the second route information, and (v) identification information of the second network communication apparatus.

15. A network communication apparatus which is connected to a network and which performs communication with a second network communication apparatus through one or more NAT routers, said network communication apparatus comprising one or more processors including:
a direct search unit configured to transmit a direct search request to the second network communication apparatus;
a route information creating unit configured to create second route information, the second route information includes a LAN side address and a WAN side address of each NAT router that is passed on a way leading from said network communication apparatus to an address management apparatus;
a self-route storage unit for storing the second route information created by said route information creating unit;
a route information obtaining unit configured to obtain first route information including a LAN side address and a WAN side address of each NAT router that is passed on a way leading from the second network communication apparatus to the address management apparatus, from the second network communication apparatus;
a route deriving unit configured to derive a route leading to the second network communication apparatus from the second route information stored in said self-route storage unit and the first route information of the second network communication apparatus, which is obtained by said route information obtaining unit; and
a communication control unit configured to perform, communication with the second network communication apparatus,
wherein said communication control unit performs communication directly with the second network communication apparatus through a local network using an address of the second network communication apparatus obtained by said direct search unit when it is detected by the direct search request that the second network communication apparatus and said network communication apparatus belong to the local network, and
wherein said communication control unit performs communication with the second network communication apparatus based on the route derived by the route deriving unit when it is not detected by the direct search request that the second network communication apparatus and said network communication apparatus belong to the local network.

16. A method for network communication in which a network communication apparatus connected to a network performs communication with a second network communication apparatus through one or more NAT routers said method comprising:
a direct search step of transmitting a direct search request to the second network communication apparatus;
a judgment step of judging whether or not information regarding the second network communication apparatus is obtained upon the direct search request;
a direct communication step of performing, when it is judged that the information is obtained, communication with the second network communication apparatus based on the obtained information;
a route information obtaining step of obtaining, when it is judged that the information is not obtained, first route information from an address management apparatus which holds the first route information, the first route information including a LAN side address and a WAN side address of each NAT router that is passed on a way leading from the second network communication apparatus to the address management apparatus;
a route deriving step of deriving a route leading from the network communication apparatus to the second network communication apparatus by comparing the obtained first route information and second route information, the second route information including a LAN side address and a WAN side address of each NAT router that is passed on a way leading from the network communication apparatus to the address management apparatus; and a communication step of performing communication with the second network communication apparatus, wherein said communication step performs communication directly with the second network communication apparatus through a local network using an address of the second network communication apparatus obtained by said direct search step when it is detected by the direct search request that the second network communication apparatus and the network communication apparatus belong to the local network, and wherein said communication step performs communication with the second network communication apparatus based on the route derived by the route deriving step when it is not detected by the direct search request that the second network communication apparatus and the network communication apparatus belong to the local network.

17. The method for network communication according to claim 16, further comprising:

a route information creating step of creating, when connected to the network, the second route information; and a route information registering step of registering, in the address management apparatus, the second route information created in said route information creating step.

18. A non-transitory computer readable recording medium having recorded thereon a network communication program for performing, through one or more NAT routers, communication between a network communication apparatus and a second network communication apparatus connected to a network, wherein when executed, the network communication program causes a computer to perform a method comprising:

a direct search step of transmitting a direct search request to the second network communication apparatus;

a judgment step of judging whether or not information regarding the second network communication apparatus is obtained upon the direct search request;

a direct communication step of performing, when it is judged that the information is obtained, communication with the second network communication apparatus based on the information;

a route information obtaining step of obtaining, when it is judged that the information is not obtained, first route information from an address management apparatus which holds the first route information, the first route information including a LAN side address and a WAN side address of each NAT router that is passed on a way leading from the second network communication apparatus to the address management apparatus;

a route deriving step of deriving a route leading from the network communication apparatus to the second network communication apparatus by comparing the first obtained route information and second route information, the second route information including a LAN side address and a WAN side address of each NAT router that is passed on a way leading from the network communication apparatus to the address management apparatus; and a communication step of performing communication with the second network communication apparatus, wherein said communication step performs communication directly with the second network communication apparatus through a local network using an address of the second network communication apparatus obtained by said direct search step when it is detected by the direct search request that the second network communication apparatus and the network communication apparatus belong to the local network, and wherein said communication step performs communication with the second network communication apparatus based on the route derived by the route deriving step when it is not detected by the direct search request that the second network communication apparatus and the network communication apparatus belong to the local network.

* * * * *

UNITED STATES PATENT AND TRADEMARK OFFICE
CERTIFICATE OF CORRECTION

PATENT NO.        : 8,000,280 B2  
APPLICATION NO.   : 12/089178  
DATED             : August 16, 2011  
INVENTOR(S)       : Hideaki Takechi et al.

Page 1 of 1

It is certified that error appears in the above-identified patent and that said Letters Patent is hereby corrected as shown below:

In column (22), lines 21-23 of claim 15, change "a communication control unit configured to perform, communication with the second network communication apparatus," to --a communication control unit configured to perform communication with the second network communication apparatus,--.

Signed and Sealed this
Fourteenth Day of February, 2012

David J. Kappos
*Director of the United States Patent and Trademark Office*